US008432566B2

(12) United States Patent
Adachi et al.

(10) Patent No.: US 8,432,566 B2
(45) Date of Patent: Apr. 30, 2013

(54) PRINTER DRIVER AND METHOD OF PRINTING PRINT DATA

(75) Inventors: Tadashi Adachi, Nagano-ken (JP); Toshiyuki Sugimoto, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 861 days.

(21) Appl. No.: 12/423,534

(22) Filed: Apr. 14, 2009

(65) Prior Publication Data
US 2009/0262394 A1  Oct. 22, 2009

(30) Foreign Application Priority Data

Apr. 17, 2008 (JP) ................................ 2008-107557

(51) Int. Cl.
*G06F 15/00* (2006.01)
(52) U.S. Cl.
USPC .............. 358/1.15; 400/8; 400/61; 400/76; 400/582; 400/607.3; 358/1.2; 358/1.13; 358/1.18; 358/468; 347/16; 347/104; 715/200; 715/800

(58) Field of Classification Search ........................ None
See application file for complete search history.

(56) References Cited

U.S. PATENT DOCUMENTS

| | | | | |
|---|---|---|---|---|
| 5,128,762 A * | 7/1992 | Muramatsu et al. | .......... | 358/296 |
| 5,333,039 A * | 7/1994 | Sagara | ............... | 399/4 |
| 5,493,421 A * | 2/1996 | Uetama et al. | ................ | 358/468 |
| 5,546,520 A * | 8/1996 | Cline et al. | .................... | 715/800 |
| 5,963,216 A * | 10/1999 | Chiarabini et al. | ........... | 345/660 |
| 5,973,793 A * | 10/1999 | Yoshida | ........................ | 358/449 |
| 6,018,618 A * | 1/2000 | Yoshida | ........................ | 358/1.18 |
| 6,298,358 B1 * | 10/2001 | Gormish | ........................ | 715/236 |
| 6,416,147 B1 * | 7/2002 | Li et al. | .............................. | 347/9 |
| 6,428,224 B1 * | 8/2002 | Askren et al. | ................. | 400/582 |
| 6,489,936 B1 * | 12/2002 | Gormish | ........................ | 345/2.1 |
| 6,663,303 B2 * | 12/2003 | Horiuchi et al. | ................ | 400/61 |
| 6,786,971 B2 * | 9/2004 | Anderson | ....................... | 118/63 |
| 7,212,309 B1 * | 5/2007 | Sellers et al. | ................... | 358/1.2 |
| 7,284,919 B2 * | 10/2007 | Kinoshita | ........................ | 400/76 |
| 7,344,323 B2 * | 3/2008 | Fries et al. | ....................... | 400/88 |
| 7,437,659 B2 * | 10/2008 | Taniwaki et al. | ............. | 715/200 |
| 7,878,723 B2 * | 2/2011 | Igarashi et al. | ............... | 400/582 |
| 8,009,317 B2 * | 8/2011 | Nagata | .......................... | 358/1.18 |
| 8,061,914 B2 * | 11/2011 | Sasaki et al. | ............... | 400/607.2 |

(Continued)

FOREIGN PATENT DOCUMENTS

| | | |
|---|---|---|
| JP | 5-124232 | 5/1993 |
| JP | 06-038001 | 2/1994 |

(Continued)

*Primary Examiner* — King Poon
*Assistant Examiner* — Ted Barnes

(57) ABSTRACT

A printer driver conserves recording paper by removing blank space formed at the top and bottom of each page when printing. The printer driver acquires the coordinates of the top and bottom of the part of the print image, and calculates the page length required to print the middle area between the top and bottom blank space areas based on these coordinates. The print data for printing this middle area is then extracted and printed. When printing is completed, the recording paper is conveyed only the difference between the page length and the transportation distance of the recording paper to set the print head to a position separated only the page length from the printing start position of the area print data, that is, to a position touching the middle area. As a result, blank space between the middle areas of consecutively printed pages is eliminated.

8 Claims, 7 Drawing Sheets

U.S. PATENT DOCUMENTS

| | | | | |
|---|---|---|---|---|
| 8,215,742 B2* | 7/2012 | Nakata | | 347/16 |
| 2001/0046401 A1* | 11/2001 | Lien et al. | | 400/240 |
| 2002/0101492 A1* | 8/2002 | Hierro et al. | | 347/104 |
| 2002/0164185 A1* | 11/2002 | Horiuchi et al. | | 400/76 |
| 2003/0007023 A1* | 1/2003 | Barclay et al. | | 347/8 |
| 2003/0072597 A1* | 4/2003 | Someno | | 400/621 |
| 2004/0050273 A1* | 3/2004 | Hansburg | | 101/227 |
| 2005/0160194 A1* | 7/2005 | Bango et al. | | 710/8 |
| 2006/0023251 A1* | 2/2006 | Petteruti et al. | | 358/1.15 |
| 2006/0050097 A1* | 3/2006 | Hoshiyama et al. | | 347/16 |
| 2006/0285163 A1* | 12/2006 | Han et al. | | 358/1.18 |
| 2006/0290952 A1* | 12/2006 | Owen | | 358/1.8 |
| 2006/0290966 A1* | 12/2006 | Owen | | 358/1.13 |
| 2007/0188789 A1* | 8/2007 | Hyogo et al. | | 358/1.12 |
| 2008/0223512 A1* | 9/2008 | Sievel | | 156/250 |
| 2009/0168094 A1* | 7/2009 | Horiuchi et al. | | 358/1.15 |
| 2009/0190184 A1* | 7/2009 | Jingu | | 358/444 |
| 2010/0327509 A1* | 12/2010 | McGarry | | 270/18 |

FOREIGN PATENT DOCUMENTS

| | | |
|---|---|---|
| JP | 6-083823 | 3/1994 |
| JP | 2002-240371 | 8/2002 |
| JP | 2002-240371 A | 8/2002 |
| JP | 2007-219813 A | 8/2007 |

* cited by examiner

PRINTER DRIVER AND METHOD OF PRINTING PRINT DATA

CROSS-REFERENCE TO RELATED APPLICATION(S)

Japanese Patent application No. 2008-107557 is hereby incorporated by reference in its entirety.

BACKGROUND

1. Field of Invention

The present invention relates to a printer driver, and more particularly to a method of printing print data that enables removing bands of white space, such as margins and empty lines formed at the top and bottom of each page, when printing print data.

2. Description of Related Art

When print data produced by an application program is printed, margins are commonly formed at the top and bottom of each page. In addition, when the text, images, or other content contained in the print data for a page occupy less than a full page, the content may be printed in a vertically-centered orientation, with a number of empty lines inserted at both the top and bottom of the page contiguous to the top and bottom margins. These bands of white space formed at the top and bottom of each page are inserted so that the text and images contained in the print data will be printed in the center of the page and positioned according to a specified format.

However, when print data is printed simply to verify the content of the text and images contained in the print data before printing the final printout in the desired output format, it is not necessary to include the bands of white space at the top and bottom of each printed page. Removing the data for the top and bottom bands of white space from the print data so that only the data contained in the text and images is printed would therefore be economical, because the amount of paper consumed for printing would be reduced.

Japanese Unexamined Patent Appl. Pub. JP-A-H06-83823 is directed to a data output device that can generate print data from which data for the bands of white space is removed from the print data. The device taught in JP-A-H06-83823 divides the print image of the print data into a plurality of lines, determines for each line whether the line is blank, and removes white space by removing the data for each line determined to be blank from the print data.

Japanese Unexamined Patent Appl. Pub. JP-A-H06-38001 is directed to a facsimile machine that can remove the data for bands of white space from image data received over a telephone line before printing the data. The facsimile machine taught in JP-A-H06-38001 divides the print image into a plurality of lines, determines for each line whether the line is blank, and removes white space by not sending the data for each line determined to be blank to the printing unit.

A problem with these methods of removing data for lines determined to be white space from the print data is that, in addition to removing bands of white space at the top and bottom of each page, they also remove bands of white space intentionally included in the content contained in the middle area to be printed between the white space at the top of the page and the white space at the bottom of the page. This changes the layout of the text and images in this middle area, making it no longer possible to confirm the placement of text and images in this middle area.

The foregoing related art does not consider whether the full printing width of the print head in the transportation direction of the recording medium is used when printing the bottom (trailing) end of the middle area of each page, or whether only part of the printing width of the print head is used. This means that in order to prevent the bottom of the middle area of a page (which is printed first) and the top of the middle area of the second page (which is printed next) from overlapping, the recording medium must be advanced at least the printing width of the print head after finishing printing the middle area of the first page, or printing the middle area of the second page must start after advancing the recording medium at least the printing width of the print head.

However, advancing the recording medium in this way produces bands of white space between the middle areas printed for each page, even though the data for the bands of white space at the top and bottom of each page has been removed from the print data.

FIG. 7 illustrates one aspect of the problem. The print head 101 (positioned at the side of the recording medium 100) is shown relative to the recording medium 100. More particularly, 101(1) depicts the position of the print head when the bottom end part of the middle area of the first page was printed, and 101(2) depicts the position of the print head after the recording medium 100 was advanced the printing width Q of the print head 101 after printing the middle area was finished. If only a portion (the shaded part) of the printing width Q of the print head 101 is used to print the bottom end part of the middle area of the first page and the recording medium 100 is then advanced only printing width Q, the print head 101(2) will not be positioned adjacent to the middle area of the first page and will instead be separated distance R from the position adjacent to the first printed middle area. This distance R is equal to the remaining portion of the printing width of the print head 101 that was not used for printing the bottom end of the first middle area. If printing the print data for the next page starts from this position, a band of white space will be formed between the bottom end of the first middle area and the top end of the middle area that is printed next.

SUMMARY OF INVENTION

A printer driver and a method of printing according to the present invention enable removing the band(s) of blank (also referred to as "white") space formed at the top and/or bottom of a print image for one page when printing a print portion of the print image on recording paper, without removing any blank spaces within the print portion.

When the middle areas (print portions) of the pages are printed continuously by removing the top and bottom bands of white space from the print image for each page, a printer driver and a method of printing according to the present invention also prevent forming bands of white space between the printed middle areas of each page.

A first aspect of the invention is directed to a printer driver that comprises a print image generating unit that generates a print image from one page of print data; a coordinate acquisition unit that acquires for the generated print image an upper-end coordinate and a lower-end coordinate defining a printing area, which includes at least a print portion; a page length calculation unit that calculates, based on the upper-end coordinate and the lower-end coordinate, a length of the printing area on recording paper, the length excluding at least one of a band of bottom blank space contained in the print image below the lower-end coordinate and a band of top blank space contained in the print image above the upper-end coordinate, the length representing a page length; an area print data extraction unit that extracts area print data between the upper-end coordinate and the lower-end coordinate to be included in the printing area; an area print data printing unit that controls driving of a printer to print the print portion in the printing area on the recording paper, a print head of the printer being positioned at a first start printing position when the printing of the print portion in the printing area begins; and a print head positioning unit that controls driving of the printer when printing of the print portion in the printing area is complete to advance the recording paper in a printing transportation direction to position a print head of the printer to a second start printing position, which is a page length from the first starting position.

The printer driver according to the invention generates a print image by converting print data received from an application program, for example, to a two-dimensional image that contains top and bottom blank spaces, and acquires upper-end and lower-end coordinates. The upper-end coordinate may be a top coordinate that defines a top of the print image or a top-end coordinate that is closest to or defines a top of the print portion, depending on whether the top blank space is to be removed. Similarly, the lower-end coordinate may be a bottom coordinate that defines a bottom of the print image or a bottom-end coordinate that is closest to or defines a bottom of the print portion, depending on whether the bottom blank space is to be removed. In the case in which both the top and bottom blank spaces are to be removed—and hence the top-end and bottom-end coordinates are acquired, the area print data extraction unit extracts the area print data for printing only the middle area (print portion) between the top blank space and bottom blank space from the print image of each page based on such coordinates.

Furthermore, by removing the top white space and bottom white space from the output page, the amount of paper that is consumed to print the print data for the one page can be reduced. In addition, because bands of white space inside the middle area that is printed are not removed, the layout of text and images in the middle area is not changed. It is therefore possible to confirm both the content of the text and images and the layout of the text and images in the middle area, while at the same time reducing the amount of paper consumed.

In addition, the printer driver of the invention calculates, as the page length, the length of recording paper required to print the middle area based on the upper-end coordinate and lower-end coordinate, and positions the print head of the printer to a position separated the page length in the transportation direction from the position at which printing of the area print data was started. The printer driver does so by advancing the recording paper in the printing transportation direction when the printing of the area print data is finished. As a result, the print head is positioned adjacent in the transportation direction to the printed middle area, and this position becomes the printing start position for the area print data of the next page.

It is therefore possible to start printing the next block of area print data from a position adjacent to the previously printed middle area regardless of whether the full print width of the print head was used to print the bottom end part of the middle area of a page or whether only part of the print width of the print head was used. Therefore, when the middle areas of plural pages are printed continuously with the top white space and bottom white space for each page removed, bands of white space are not formed between the middle areas of the printed pages.

In order to set the print head to a position separated only the page length in the transportation direction from the printing start position of the area print data by advancing the recording paper, a printer driver according to another aspect of the invention preferably has a page length storage unit for storing the page length in the printer, and the print head positioning unit obtains the difference between the page length and the transportation distance that the recording paper is conveyed in the printing of the print portion, and conveys the recording paper only this difference.

Further preferably, in order to selectively remove only the bottom white space from the print image, the printer driver according to another aspect of the invention preferably has a deletion area setting unit to select whether to print with (i) both the top blank space and bottom blank space removed, or (ii) only the bottom blank space removed. In the case of (i), the page length calculation unit calculates the length of the printing area on recording paper required to print the print portion, and the area print data extraction unit extracts the print portion as the area print data. In the case of (ii), the page length calculation unit calculates the length of the printing area on the recording paper required to print the print portion and the top blank space, and the area print data extraction unit extracts the print portion and the top blank space as the area print data.

Further preferably, in order to remove only the top white space from the print image, the printer driver according to another aspect of the invention preferably has a deletion area setting unit to select whether to print with (i) both the top blank space and bottom blank space removed, or (ii) only the top blank space removed. In the case of (i), the page length calculation unit calculates the length of the printing area on recording paper required to print the print portion, and the area print data extraction unit extracts the print portion as the area print data. In the case of (ii), the page length calculation unit calculates the length of the printing area on the recording paper required to print the print portion and the bottom blank space, and the area print data extraction unit extracts the print portion and the bottom blank space as the area print data.

In order to print normally without removing either the bottom white space or the top white space, the deletion area setting unit may be further configured to enable to print without removing such spaces. The driving of the printer would then be controlled accordingly.

If the printer to which the printer driver of the invention is applied is a roll paper printer that prints to a web of recording paper delivered from a roll of paper, the economic benefit of deleting top white space and bottom white space when printing is particularly great.

Another aspect of the invention is a method of printing that comprises generating a print image from one page of print data; acquiring for the generated print image an upper-end coordinate and a lower-end coordinate defining a printing area, which includes at least a print portion; calculating, based on the upper-end coordinate and the lower-end coordinate, a length of the printing area on recording paper, the length excluding at least one of a band of bottom blank space contained in the print image below the lower-end coordinate and a band of top blank space contained in the print image above the upper-end coordinate, the length representing a page length; extracting area print data between the upper-end coordinate and the lower-end coordinate to be included in the printing area; controlling driving of a printer to print the print portion in the printing area on the recording paper, a print head of the printer being positioned at a first start printing position when the printing of the print portion in the printing area begins; and controlling driving of the printer when printing of the print portion in the printing area is complete to advance the recording paper in a printing transportation direction to position a print head of the printer to a second start printing position, which is a page length from the first starting position.

The operations or steps of this aspect of the invention are substantially similar to the previously-described functions of the printer driver. The designation of the upper-end coordinate and lower-end coordinate is the same as well. The removal of band(s) of white space above and/or below the print portion reduces paper consumption.

In order to set the print head to a position separated only the page length in the transportation direction from the printing start position of the area print data by advancing the recording paper, the method of printing according to another aspect of the invention preferably also has a page length storage step for storing the page length in the printer after the page length calculation step, and the print head positioning step obtains the difference between the page length and the transportation distance the recording paper is conveyed in the printing of the area print data, and conveys the recording paper only this difference.

Further preferably, in order to remove only the bottom white space from the print image, the method of printing according to another aspect of the invention preferably also includes selecting whether to print with (i) both the top blank space and bottom blank space removed, or (ii) only the bottom blank space removed. In the case of (i), the calculating step comprises calculating the length of the printing area on recording paper required to print the print portion, and the extracting step comprises extracting the print portion as the area print data. In the case of (ii), the calculating step comprises calculating the length of the printing area on the recording paper required to print the print portion and the top blank space, and the extracting step comprises extracting the print portion and the top blank space as the area print data.

Further preferably, in order to remove only the top white space from the print image, the method of printing according to another aspect of the invention preferably also includes selecting whether to print with (i) both the top blank space and bottom blank space removed, or (ii) only the top blank space removed. In the case of (i), the calculating step comprises calculating the length of the printing area on recording paper required to print the print portion, and the extracting step comprises extracting the print portion as the area print data. In the case of (ii), the calculating step comprises calculating the length of the printing area on the recording paper required to print the print portion and the bottom blank space, and the extracting step comprises extracting the print portion and the bottom blank space as the area print data As described above, the deletion area selection step can be configured to further enable the printing without removal of either the top white space or the bottom white space, in which case the printer is controlled accordingly.

If the printer is a roll paper printer that prints to a web of recording paper delivered from a roll of paper, the economic benefit of deleting top white space and bottom white space when printing is particularly great.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A preferred embodiment of the present invention is described below with reference to the accompanying figures.

Printing System

Figure 1:
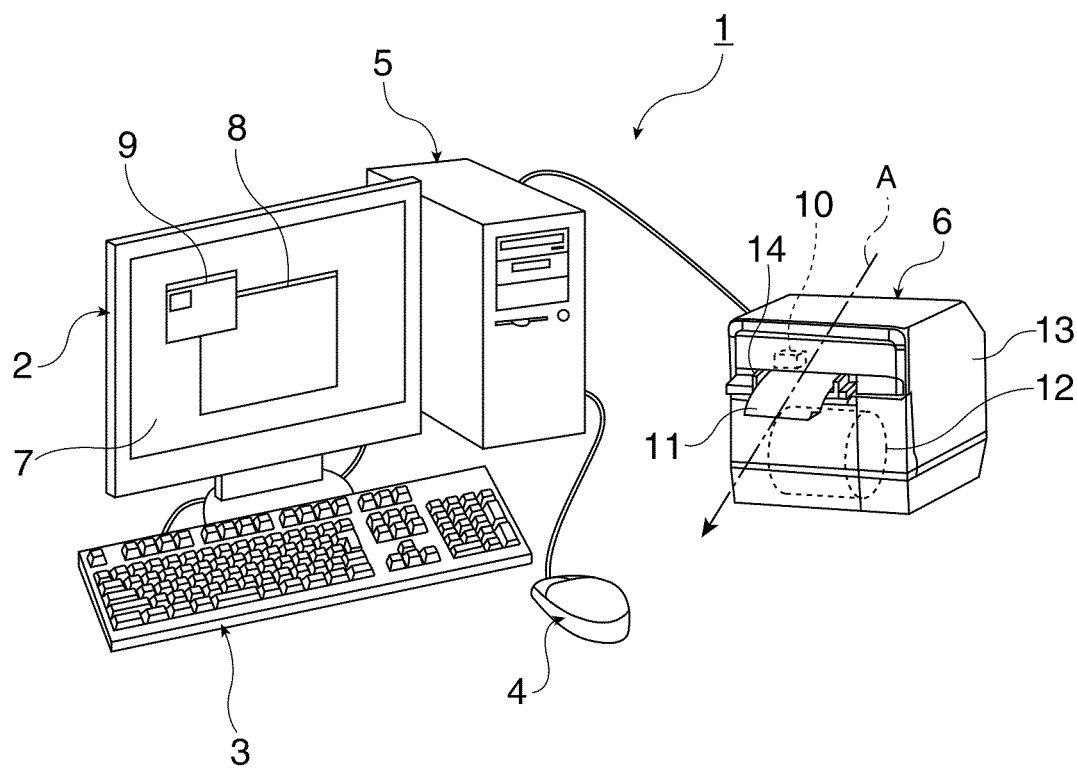
FIG. 1 is an oblique view of a printing system using the printer driver of embodiments of the invention.

FIG. 1 is an oblique view of a printing system using a printer driver in accordance with embodiments of the invention.

The printing system 1 according to embodiments of the invention includes a computer 5 to which input and output devices, such as a display 2, keyboard 3, and mouse 4 are connected, and a roll paper printer 6 connected to the computer 5. Installed in the computer 5 are an operating system (OS) 7, an application program 8 that runs under the OS 7, and a printer driver 9. The printer driver 9 receives print data output from the application program 8 through the OS 7, and controls driving the roll paper printer 6 to print the print data.

The roll paper printer 6 prints by repeating the operations of printing on the recording paper 11 while moving the print head 10 in the main scanning direction and conveying the recording paper 11 in the transportation direction A, which is perpendicular to the main scanning direction. The roll paper 12 from which the continuous web of recording paper 11 is conveyed is stored inside the case 13 of the roll paper printer 6. The recording paper 11 is conveyed through the transportation path past the print head 10, and is discharged from a recording paper exit 14 formed in the front of the case 13.

The printer driver 9 has a function for removing bands of white space containing any margin and empty lines formed at the top and bottom of each page when printing print data generated by the application program 8, and printing the print data.

Printer Driver

Figure 2:
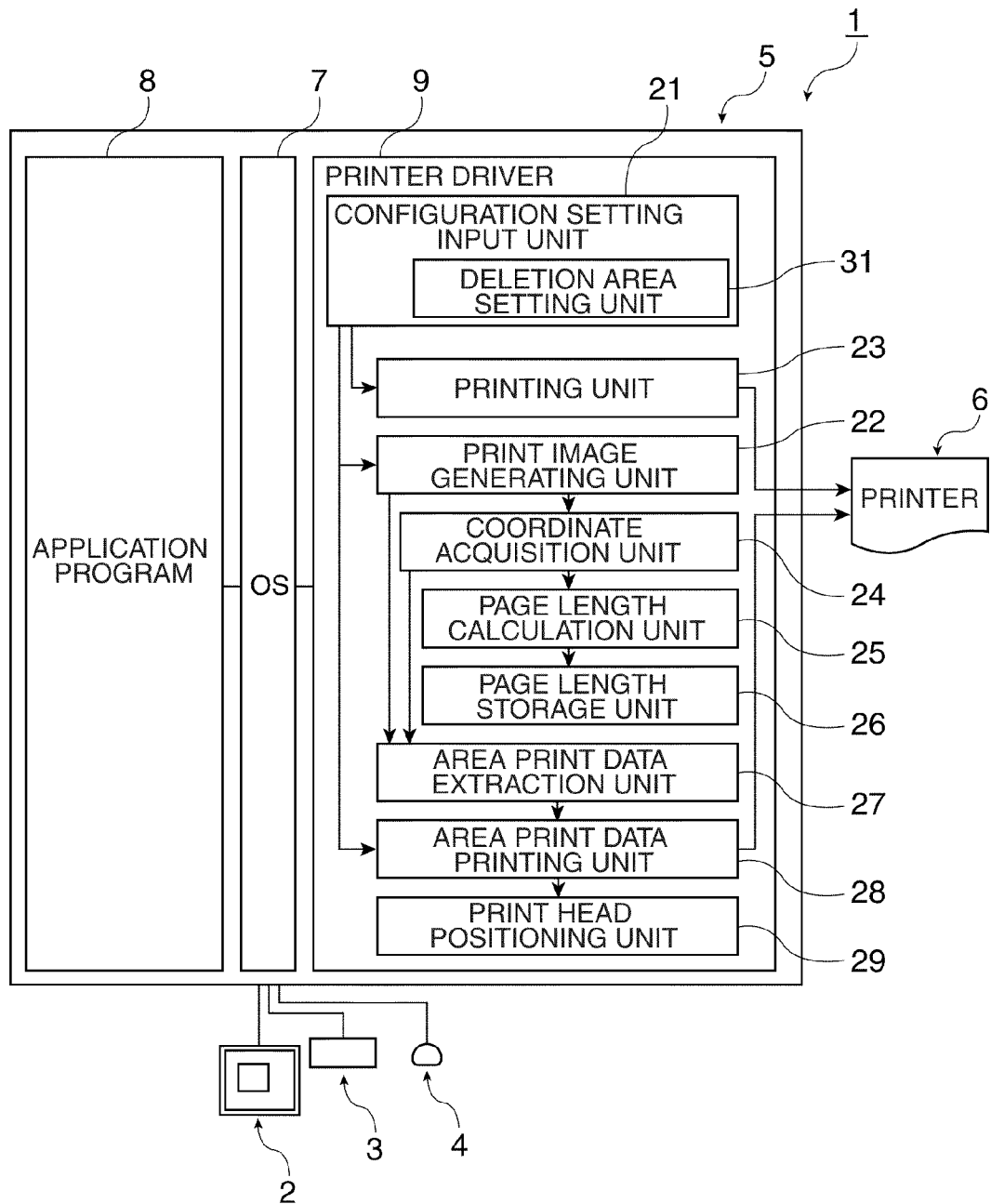
FIG. 2 is a block diagram describing a printer driver according to embodiments of the invention.

FIG. 2 is a block diagram illustrating a printer driver 9 installed in the computer 5 according to embodiments of the invention.

The printer driver 9 has a configuration setting input unit 21 enabling the user to configure various print settings before printing. The printer driver 9 also has a print image generating unit 22, printing unit 23, coordinate acquisition unit 24, page length calculation unit 25, page length storage unit 26, area print data extraction unit 27, area print data printing unit 28, and print head positioning unit 29.

Figure 3:
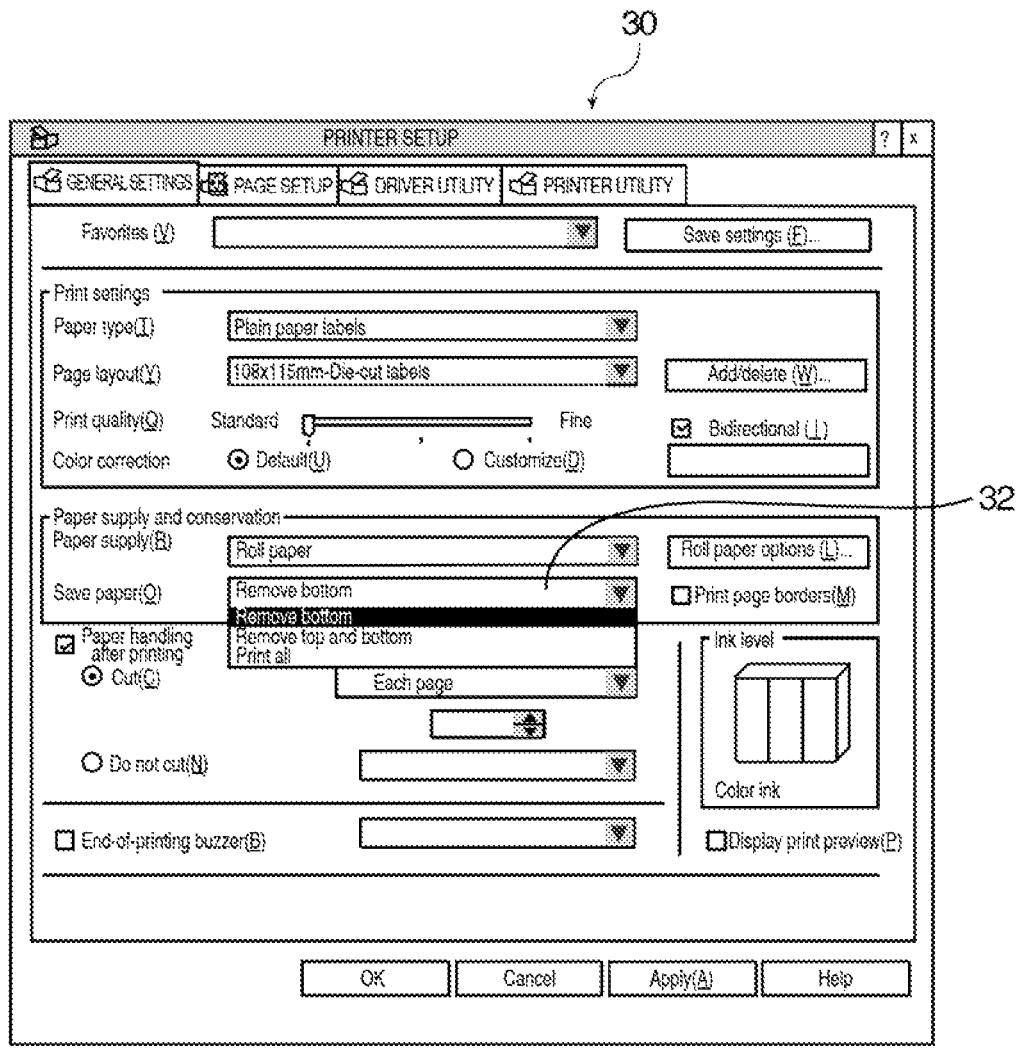
FIG. 3 shows a dialog box in which the printer driver is displayed.

FIG. 3 shows a dialog box for displaying the configuration setting input unit 21 on the display 2. The configuration setting input unit 21 enables the user to set the type of recording paper 11, the print quality, and other settings using menus and other input tools displayed in the dialog box 30. The configuration setting input unit 21 includes a deletion area setting unit 31 whereby the user specifies whether to remove white space when printing, and from what position(s) the white space is to be removed.

The deletion area setting unit 31 displays a pull down menu 32 in dialog box 30. The pull down menu 32 includes options such as "remove top and bottom" for removing white space from both the top and bottom of each page, "remove bottom" for removing white space only at the bottom of each page, and "normal printing" to enable normal printing without removing white space from the top and bottom of each page. When the user selects one of these options from the menu, the selected menu option is set as the print mode for printing the print data.

Figure 4:
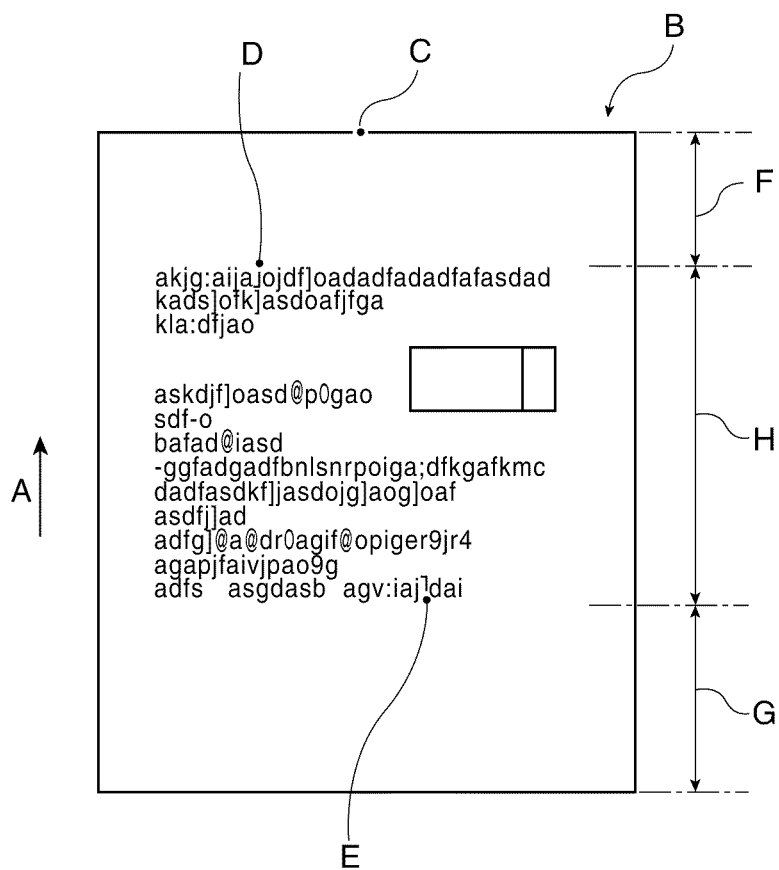
FIG. 4 schematically describes a print image.

The print image generating unit 22 converts the print data to a two-dimensional print image for each page to be printed. FIG. 4 schematically illustrates the two-dimensional print image written to memory. Because of the manner in which printing typically occurs, the top end of the print image B generated for one page corresponds to the downstream end of the recording paper 11 in the transportation direction A when printing, and the bottom end of the print image B corresponds to the upstream end of the recording paper 11 in the transportation direction A.

When the print mode is set to "do not remove" (or "normal") to enable printing normally without removing top or bottom white space, the printing unit 23 controls driving the roll paper printer 6 to print the print data for one page onto recording paper 11. The printing unit 23 prints using the image data for the print image B generated by the print image generating unit 22. More specifically, the printing unit 23 divides the image data for the print image B into the blocks of print image data that are printed one line at a time as the print head 10 moves in the main scanning direction, and the printing unit 23 repeats the operations of printing the print image data and advancing the recording paper 11 line by line until there is no print image data left to print.

The coordinate acquisition unit 24 acquires the coordinate of the top of the two-dimensional print image B stored in memory as top coordinate C. The coordinate acquisition unit 24 also acquires the coordinates of the portion of the print image that is not white space in the print image B, sometimes referred to as the print portion, acquiring the coordinate for the print portion that is closest to its top end as top-end coordinate D and the coordinate for the print portion that is closest to its bottom end as bottom-end coordinate E. These acquired coordinates describe the locations of the top and bottom of the print image B, or more specifically the positions of the ends in the transportation direction A.

These coordinates can be obtained using methods known from the literature. For example, the memory area where the print image B is stored in memory may be scanned from beginning to end to acquire the coordinates. Alternatively, because the coordinates only need to identify the positions of the top and bottom of the print image B, the print image B can be divided into a plurality of lines perpendicular to the top-to-bottom direction, the print image B can be scanned from top to bottom, the position of the first line that is not blank and is contained in the print image B can be set as top-end coordinate D, and the last line that is not blank and is contained in the print image B can be set as bottom-end coordinate E.

The band of space above the top-end coordinate D at the top end of the print image B is referred to herein as top white space F, and the band of space below the bottom-end coordinate E at the bottom end of the print image B is referred to herein as bottom white space G. The band of area that is below the top-end coordinate D and above the bottom-end coordinate E of the print image B is the middle area H bounded by the top-end coordinate D and the bottom-end coordinate E. This middle area H contains the text, graphics, images, and other content contained in the print data for one page. Middle area H is also sometimes referred to as the print portion.

When the top white space F and bottom white space G are removed from the print image B, the page length calculation unit 25 calculates the length of the recording paper 11 required to print the remaining area as the page length.

More specifically, when the remove-top-and-bottom print mode, which removes the top white space F and bottom white space G when printing, is set, the page length calculation unit 25 calculates the length of recording paper 11 required to print the middle area H as the page length based on the top-end coordinate D and bottom-end coordinate E.

When the remove-bottom print mode, which removes the bottom white space G when printing, is set, the page length calculation unit 25 calculates the length of recording paper 11 required to print the top white space F and the middle area H as the page length based on the top coordinate C and bottom-end coordinate E.

Because the two-dimensional print image B written to memory corresponds directly to the content that is actually printed on the recording paper 11, the page length can be accurately calculated based on the top coordinate C or top-end coordinate D, and bottom-end coordinate E.

The page length storage unit 26 sends the page length calculated by the page length calculation unit 25 to the roll paper printer 6, and saves this page length in the roll paper printer 6.

The area print data extraction unit 27 extracts the part of the data to be printed in the area other than the areas that are removed according to the print mode as "area print data."

More specifically, when the remove-top-and-bottom print mode is set so that the top white space F and bottom white space G are removed while printing, the data needed to print the middle area H is extracted as the area print data based on the top-end coordinate D and bottom-end coordinate E.

When the remove-bottom print mode that removes the bottom white space G when printing is set, the data needed to print the top white space F and middle area H is extracted as the area print data based on the top coordinate C and the bottom-end coordinate E.

More specifically, the area print data extraction unit 27 reconverts the print data for the page to be printed into a two-dimensional image to generate the print image B, and extracts the data for printing the areas other than the areas that are to removed according to the print mode from the image data of this print image B as the area print data. This area print data is extracted for each line of print image data that is printed while moving the print head 10 in the main scanning direction, and the data is passed to the area print data printing unit 28 as it is extracted.

Note that the area print data extraction unit 27 uses the print image B that is already stored in memory, and can be configured to extract the data in the middle area H or the data for the top white space F and middle area H.

When the area print data is extracted from the print data, the area print data printing unit 28 controls driving the roll paper printer 6 to print this area print data to recording paper 11. More specifically, the roll paper printer 6 prints each line of print image data as it is received from the area print data extraction unit 27. When the print image data for the next line is received, the roll paper printer 6 advances the recording paper 11 and then prints the print image data for that next line.

When printing the area print data by the area print data printing unit 28 is completed, the print head positioning unit 29 controls driving of the printer to advance the recording paper 11 in the transportation direction A to position the print head 10 of the roll paper printer 6 a page length away in the transportation direction A from the printing start position of the area print data.

More specifically, because the roll paper printer 6 repeatedly calculates the difference between the stored page length and the transportation distance of the recording paper 11 as it is advanced while the area print data is printed by the area print data printing unit 28 (that is, the distance that the print head 10 moves relative to the recording paper 11), the print head positioning unit 29 can get this difference from the roll paper printer 6. As a result, if the recording paper 11 is advanced this difference, the print head 10 of the roll paper printer 6 can be set to a position separated by the page length in the transportation direction A from the printing start position of the area print data.

Note that if the roll paper printer 6 does not calculate the difference between the transportation distance of the recording paper 11 and the page length, the print head positioning unit 29 may calculate the recording paper 11 transportation distance from the number of steps the stepping motor used for roll paper transportation is driven in order to convey the recording paper 11, and advance the recording paper 11 by the difference between this transportation distance and the page length calculated by the page length calculation unit 25.

FIG. 5 describes operation whereby the print head positioning unit 29 positions the print head 10. FIG. 5 schematically shows the position of the print head 10 relative to the recording paper 11. Print head 10(10) indicates the position when starting to print the area print data for the first page. Print head 10(11) indicates the position of the print head 10 when printing the area print data for the first page is completed. Print head 10(20) is the location where the print head is positioned by the print head positioning unit 29, and is the position where printing the area print data for the second page starts.

Figure 5A:
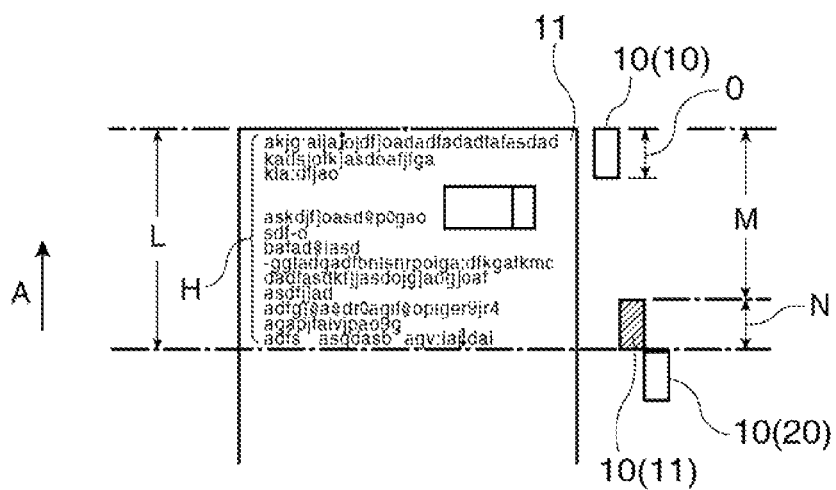
FIGS. 5A and 5B describe the position where the print head is located after printing under various conditions.

When the full printing width O (the shaded part) of the print head 10(11) in the transportation direction A of the recording paper 11 is used to print the bottom end part of the middle area H of the first page as shown in FIG. 5A, the difference N between the page length L and the transportation distance M of the recording paper 11 is the printing width O of the print head 10. Therefore, if the recording paper 11 is conveyed this difference N, the print head 10(11) moves to the position adjacent to the middle area H of the printed first page, and is located at the position indicated by the print head 10(20). This position is also the printing start position where printing the next page of area print data starts. As a result, the middle area H of the first printed page and the middle area H of the next page are printed mutually adjacent, and a band of white space is not formed therebetween.

Figure 5B:
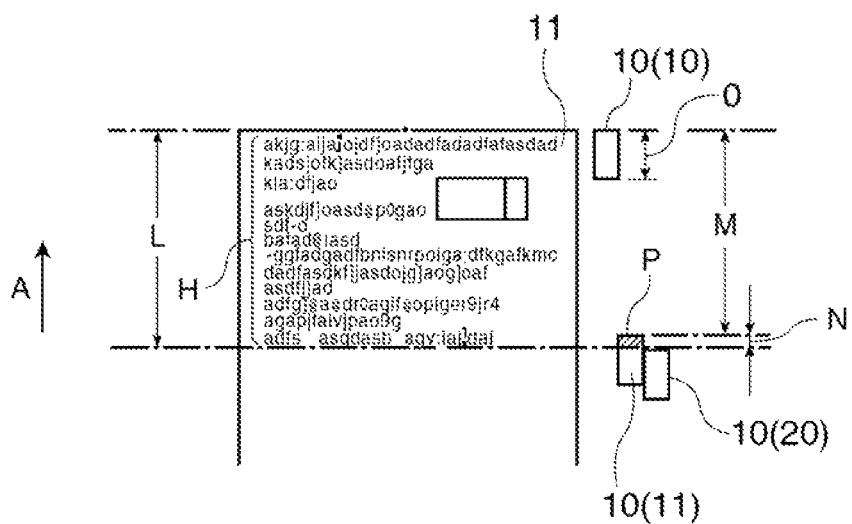

When only part of the printing width P (the shaded part) of the print head 10(11) is used to print the bottom end part of the middle area H of the first page as shown in FIG. 5B, the difference N between the page length L and the transportation distance M of the recording paper 11 is the partial length P of the print head 10 that was used for printing. Therefore, if the recording paper 11 is conveyed this difference N, the print head 10(11) moves to the position adjacent to the middle area H of the printed first page, and is located at the position indicated by the print head 10(20). This position is also the printing start position where printing the next page of area print data starts. As a result, the middle area H of the first printed page and the middle area H of the next page are printed mutually adjacent, and a band of white space is not formed therebetween.

Print Data Printing Operation

Figure 6:
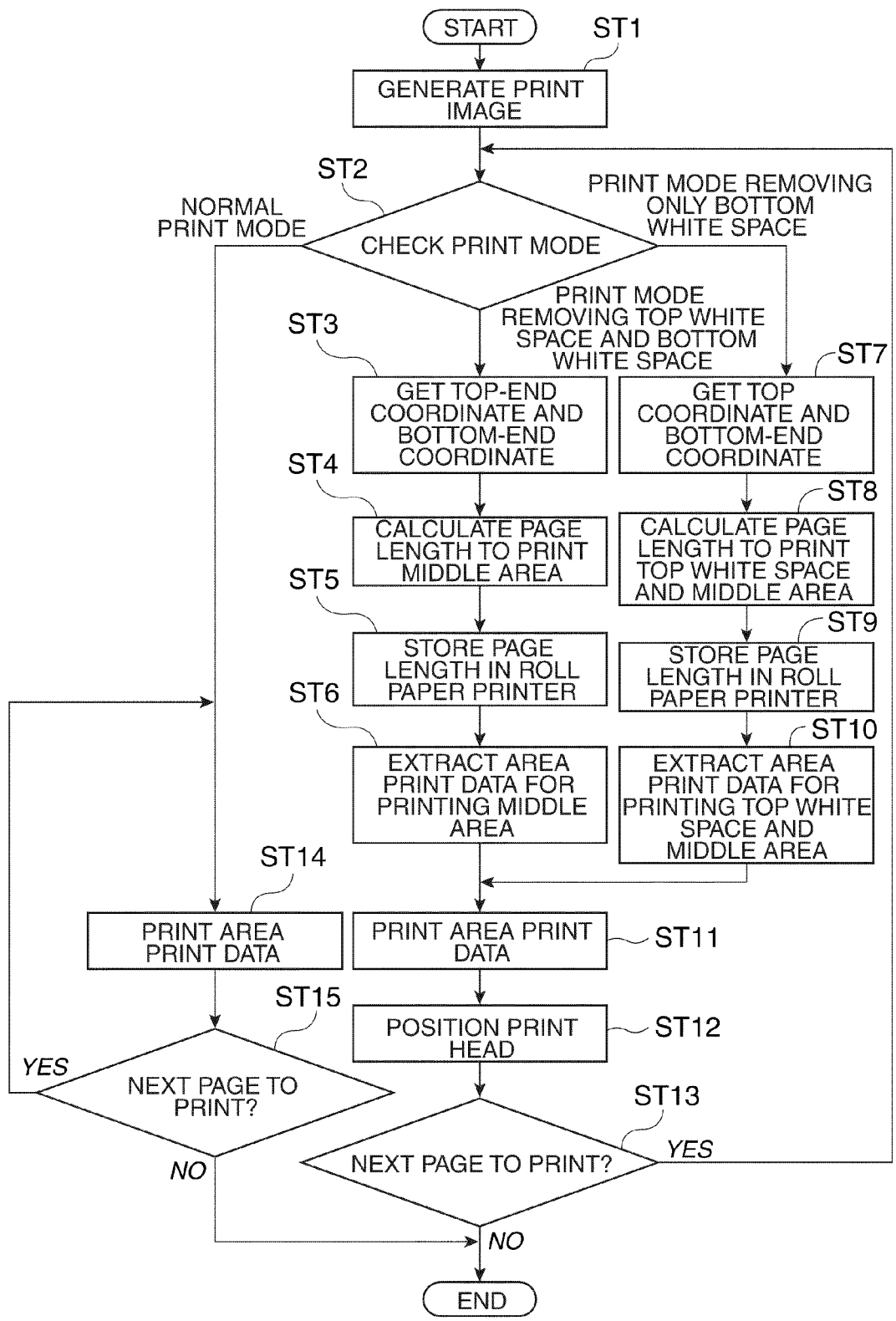
FIG. 6 is a flow chart describing the operation for printing the print data.
Figure 7:
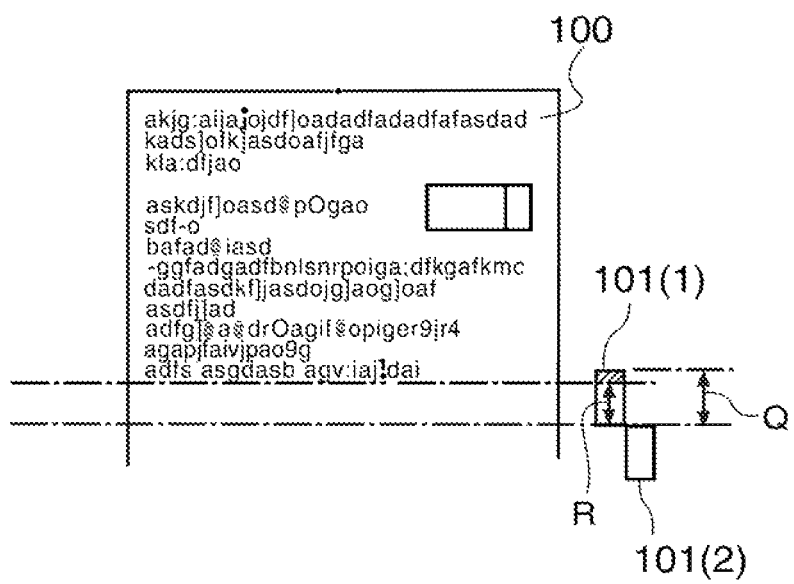
FIG. 7 describes the positioning of the print head by the related art.

FIG. 6 is a flow chart of the print data printing operation of the printer driver 9.

The user first selects one of the print mode options from the pull down menu 32 in the dialog box 30 presented on the display 2 to set the print mode. As described above, the print mode options in this embodiment of the invention include "remove top and bottom" for removing the top white space F and bottom white space G, "remove bottom" for removing the bottom white space G, and "normal printing" to enable normal printing without removing the top white space F and bottom white space G.

When the user then asserts a command to print the print data, the print image generating unit 22 converts the print data for the first page into memory and thus generates the print image B (step ST1). The deletion area setting unit 31 also confirms what print mode is set (step ST2).

If the print mode for removing the top white space F and bottom white space G when printing is selected in step ST2, the coordinate acquisition unit 24 gets the top-end coordinate D and bottom-end coordinate E from the print image B (step ST3). Based on the top-end coordinate D and bottom-end coordinate E, the page length calculation unit 25 then calculates the page length L required to print the middle area H, and the page length storage unit 26 saves the calculated page length in the roll paper printer 6 (steps ST4 and ST5). The area print data extraction unit 27 then extracts the area print data for printing the middle area H from the print head based on the top-end coordinate D and bottom-end coordinate E (step ST6).

If the print mode for removing only the bottom white space G when printing is selected in step ST2, the coordinate acquisition unit 24 gets the top coordinate C and bottom-end coordinate E from the print image B (step ST7). Based on the top coordinate C and bottom-end coordinate E, the page length calculation unit 25 then calculates the page length L required to print the top white space F and middle area H, and the page length storage unit 26 saves the calculated page length in the roll paper printer 6 (steps ST8 and ST9). The area print data extraction unit 27 then extracts the area print data for printing the top white space F and middle area H from the print head based on the top coordinate C and bottom-end coordinate E (step ST10).

When the area print data is extracted in step ST6 or step ST10, the area print data printing unit 28 controls driving the roll paper printer 6 to print the area print data on the recording paper 11 (step ST11).

When printing the area print data ends, the print head positioning unit 29 conveys the recording paper 11 in the transportation direction A used for printing to position the print head 10 of the roll paper printer 6 to a location separated page length L in the transportation direction A from the printing start position of the area print data (step ST12). More specifically, the print head positioning unit 29 gets the difference N between the page length L and the distance M that the recording paper 11 was conveyed while the area print data was printed by the area print data printing unit 28 from the roll paper printer 6, and conveys the recording paper 11 this difference N. As a result, the print head 10 is positioned to a location adjacent in the transportation direction A to the printed middle area H, and this position is the printing start position of the area print data for the next page.

When printing the print data of the area print data is completed, whether there is any print data for a next page is determined (step ST13).

If print data for a next page remains in step ST13, the operation from step ST2 to step ST12 repeats. Because the print head 10 was already set in step ST12 to a position adjacent in the transportation direction A to the printed middle area H, printing the area print data the next time step ST11 executes starts from a position adjacent to the already printed middle area H.

If there is no print data for a next page in step ST13, printing the print data ends.

If the normal mode for printing without removing the top white space F and bottom white space G is selected in step ST2, the printing unit 23 controls driving the roll paper printer 6 to print one page of print data on the recording paper 11 (step ST14). When printing the one page of print data ends, whether there is any print data for a next page is determined (step ST15), and printing the next page of print data in step ST14 repeats until there is no more print data to print. Printing the print data ends when step ST15 determines there is no more print data to print.

Note that if print data for a next page is not detected in step ST13 or step ST15, the roll paper 12 may be advanced a specific distance and discharged from the paper exit 14. The recording paper 11 may also be cut if a paper cutter is disposed to the paper exit 14.

In this embodiment of the invention the printer driver 9 generates a two-dimensional print image B based on the print data received from an application program 8, for example, and acquires the top coordinate C for the top (leading) end of the print image B, acquires the coordinate for the part of the print image that is not blank and is nearest the top end of the print image B as top-end coordinate D, and acquires the coordinate for the part of the print image that is not blank and is nearest the bottom end of the print image B as bottom-end coordinate E.

Because the area above the top-end coordinate D and the area below the bottom-end coordinate E in the print image B are bands of empty space, the area print data extraction unit 27 can extract the area print data for printing the middle area H located between the top white space F and bottom white space G from the print image B of each page. The area print data extraction unit 27 can also remove the bottom white space G and extract the area print data for printing the top white space F and middle area H from the print image B of each page based on the top coordinate C and the bottom-end coordinate E.

Furthermore, because the top white space F and bottom white space G are or the bottom white space G is removed from the printed page when the extracted area print data is printed, the amount of recording paper 11 consumed to print the print data for one page can be reduced. In addition, because bands of white space inside the middle area H are not removed, the layout of text and images in the middle area H is not changed. As a result, both the content of the text and images and the layout of the text and images in the middle area H can be confirmed.

When printing the area print data ends, the print head positioning unit 29 conveys the recording paper 11 in the transportation direction A used for printing to position the recording paper 11 of the roll paper printer 6 to a position separated page length L in the transportation direction A from the printing start position of the area print data. As a result, the print head 10 is set to a position adjacent in the transportation direction A to the printed middle area H, and this position is the printing start position of the area print data for the next page. This means that printing the next block of area print data can start from a position adjacent to the middle area H regardless of whether the full printing width O of the print head 10 was used when printing the last part of the middle area H of each page, or whether only part P of the printing width O of the print head 10 was used. As a result, when the middle areas H of multiple pages are printed continuously by removing the top white space F and bottom white space G from the print image B of the print data for each page, bands of white space are not formed between the printed middle areas H of successive pages.

Furthermore, because the user can also selectively control whether to print removing only the bottom white space G or whether to print normally without removing white space at top and bottom, the user can control printing according to the content of the print data and how the printout will be used.

Other Embodiments

In the embodiment described above the coordinates are extracted from the print image after verifying the print mode in step ST2 (step ST3, step ST7), but if the coordinate acquisition unit is configured to repeatedly acquire the top coordinate C, top-end coordinate D, and bottom-end coordinate E, the order of these steps may be reversed. More particularly, the coordinates can be acquired first, the print mode can be determined next, and branching to step ST4 or step ST8 can be controlled accordingly.

Note that if the printing unit 23 controls driving the roll paper printer 6 to print the print data without generating a print image, the print mode may be confirmed before the print image is generated in step ST1, and control can go to step ST14 if the normal print mode for printing without removing the top white space F and bottom white space G is set. In this case step ST14 repeats until there is no print data for a next page detected in step ST15.

In addition to the three print modes described above, a "remove top" print mode for removing only the top white space F when printing is also conceivable. In this case an option for removing only the top white space F is added to the pull down menu 32 presented by the deletion area setting unit 31, and this option can be selected as the print mode.

When the print mode that removes only the top white space F for printing is selected, the coordinate acquisition unit 24 can acquire the coordinate for the bottom of the print image B as the bottom coordinate. Based on the top-end coordinate D and this bottom coordinate, the page length calculation unit 25 then calculates the length of the recording paper 11 required to print the middle area H and bottom white space G as the page length L. Based on the top-end coordinate D and the bottom coordinate, the area print data extraction unit 27 extracts the data needed to print the middle area H and the bottom white space G as the area print data.

Printers to which the present invention can be applied are not limited to roll paper printers; the invention can also be applied to printers that print to cut sheet media. The invention can also be used in printers that have a line head.

Embodiments of the invention having been thus described, numerous variations will be apparent to one skilled in the art in light of such description. Any such variation is considered as within the invention to the extent that it falls within the scope of any of the following claims.

What is claimed is:

1. A printer driver, comprising:
    a print image generating unit that generates a print image from one page of print data;
    a coordinate acquisition unit that acquires for the generated print image an upper-end coordinate and a lower-end coordinate defining a printing area, which includes at least a print portion;
    a page length calculation unit that calculates, based on the upper-end coordinate and the lower-end coordinate, a length of the printing area on recording paper, the length excluding at least one of a band of bottom blank space contained in the print image below the lower-end coordinate and a band of top blank space contained in the print image above the upper-end coordinate, the length representing a page length;
    an area print data extraction unit that extracts area print data between the upper-end coordinate and the lower-end coordinate to be included in the printing area;

an area print data printing unit that controls driving of a printer to print the print portion in the printing area on the recording paper, a print head of the printer being positioned at a first start printing position when the printing of the print portion in the printing area begins; and a print head positioning unit that obtains a difference between the page length and a transportation distance the recording paper is conveyed in the printing of the print portion in the printing area and that controls driving of the printer when printing the print portion in the printing area is complete to advance the recording paper in a printing transportation direction, so as to convey the recording paper the difference.

2. The printer driver described in claim 1, further comprising:

a deletion area setting unit to select whether to print with (i) both the top blank space and bottom blank space removed, or (ii) only the bottom blank space removed;

wherein, in the case of (i), the page length calculation unit calculates the length of the printing area on recording paper required to print the print portion, and the area print data extraction unit extracts the print portion as the area print data; and wherein, in the case of (ii), the page length calculation unit calculates the length of the printing area on the recording paper required to print the print portion and the top blank space, and the area print data extraction unit extracts the print portion and the top blank space as the area print data.

3. The printer driver described in claim 1, further comprising:

a deletion area setting unit to select whether to print with (i) both the top blank space and bottom blank space removed, or (ii) only the top blank space removed;

wherein, in the case of (i), the page length calculation unit calculates the length of the printing area on recording paper required to print the print portion, and the area print data extraction unit extracts the print portion as the area print data; and wherein, in the case of (ii), the page length calculation unit calculates the length of the printing area on the recording paper required to print the print portion and the bottom blank space, and the area print data extraction unit extracts the print portion and the bottom blank space as the area print data.

4. The printer driver described in claim 1, wherein the printer comprises a roll paper printer that prints to a web of recording paper delivered from a roll of paper.

5. A method of printing by a printer, comprising:

generating a print image from one page of print data;

acquiring for the generated print image an upper-end coordinate and a lower-end coordinate defining a printing area, which includes at least a print portion;

calculating, based on the upper-end coordinate and the lower-end coordinate, a length of the printing area on recording paper, the length excluding at least one of a band of bottom blank space contained in the print image below the lower-end coordinate and a band of top blank space contained in the print image above the upper-end coordinate, the length representing a page length;

storing the calculated page length;

extracting area print data between the upper-end coordinate and the lower-end coordinate to be included in the printing area;

controlling driving of a printer to print the print portion in the printing area on the recording paper, a print head of the printer being positioned at a first start printing position when the printing of the print portion in the printing area begins;

obtaining a difference between the page length and a transportation distance the recording paper is conveyed in the printing of the print portion in the printing area when printing the print portion in the printing area is complete to advance the recording paper in a printing transportation direction, so as to position the print head of the printer to a second start printing position; and conveying the recording paper the difference.

6. The method of printing described in claim 5, further comprising:

selecting whether to print with (i) both the top blank space and bottom blank space removed, or (ii) only the bottom blank space removed;

wherein, in the case of (i), the calculating step comprises calculating the length of the printing area on recording paper required to print the print portion, and the extracting step comprises extracting the print portion as the area print data; and wherein, in the case of (ii), the calculating step comprises calculating the length of the printing area on the recording paper required to print the print portion and the top blank space, and the extracting step comprises extracting the print portion and the top blank space as the area print data.

7. The method of printing described in claim 5, further comprising:

selecting whether to print with (i) both the top blank space and bottom blank space removed, or (ii) only the top blank space removed;

wherein, in the case of (i), the calculating step comprises calculating the length of the printing area on recording paper required to print the print portion, and the extracting step comprises extracting the print portion as the area print data; and wherein, in the case of (ii), the calculating step comprises calculating the length of the printing area on the recording paper required to print the print portion and the bottom blank space, and the extracting step comprises extracting the print portion and the bottom blank space as the area print data.

8. The method of printing described in claim 5, wherein the printer comprises a roll paper printer that prints to a web of recording paper delivered from a roll of paper.

\* \* \* \* \*